United States Patent [19]
Akashi

[11] 3,955,248
[45] May 11, 1976

[54] SLIDE FASTENER SLIDER
[75] Inventor: Shunji Akashi, Kurobe, Japan
[73] Assignee: Yoshida Kogyo Kabushiki Kaisha, Japan
[22] Filed: May 22, 1975
[21] Appl. No.: 579,827

[30] Foreign Application Priority Data
May 31, 1974  Japan.......................... 49-63485[U]

[52] U.S. Cl.................... 24/205.15 R; 24/205.14 A
[51] Int. Cl.².................. A44B 19/26; A44B 19/30
[58] Field of Search............ 24/205.14 A, 205.15 R

[56]  References Cited
UNITED STATES PATENTS
2,262,188  11/1941  Warinsky.................... 24/205.14 A Primary Examiner—Bernard A. Gelak
Attorney, Agent, or Firm—Bucknam and Archer

[57]  ABSTRACT

A slide fastener slider having on its upper wing a hook-shaped lug to which a pull tab is pivotally connected by snap fitting operation. There is also provided on the upper wing a projection spaced apart from the lug and adapted to fit in an opening formed in the pull tab when the latter is moved down into contact with the slider upper wing, thereby preventing the pull tab from becoming displaced relative to the horizontal axis of the slider body.

2 Claims, 4 Drawing Figures

SLIDE FASTENER SLIDER

BACKGROUND OF THE INVENTION

This invention relates to slide fasteners and particularly to a slide fastener slider of the type which comprises in general a slider body and a pull tab pivotally connected in a snap fitting manner to a pull tab supporting lug on the slider body. As is well known in the art, the slide fastener sliders of the type described are advantageous in that the slider body and the pull tab can be easily assembled together in one-shot operation and, in the case where these slider components are made of a synthetic resin such for example as nylon, they need not be coated or plated. This type of slider has another advantage that where the slider is made of the same plastics material as fastener stringers, both fastener components may be dyed simultaneously as by piece-dyeing process so that they can be finished with uniform hue.

However, prior art sliders of this type have the drawback that since the pull tab pintle is merely snapped into engagement with a hook-shaped supporting lug by thrusting the same through and between the free end of the lug and the top surface of the upper wing, the pull tab when moved pivotally in contact with the upper wing is prone to become disengaged from the lug with the free end forcibly raised by the pintle under external stresses tending to swing the pull tab horizontally about a fulcrum on the lug.

SUMMARY OF THE INVENTION

With the above-noted difficulties of the prior art in mind, the invention has for its principal object to provide a slide fastener slider incorporating novel structural features whereby a pull tab is retained stably in position on a supporting lug against accidental stresses exerted on the pull tab during normal use or laundrying of the slide fastener.

The above and other objects and advantages will appear more clear from the following detailed description taken in conjunction with the accompanying drawings in which like reference numerals denote like parts throughout the several views.

DESCRIPTION OF THE PREFERRED EMBODIMENTS

Figure 1:
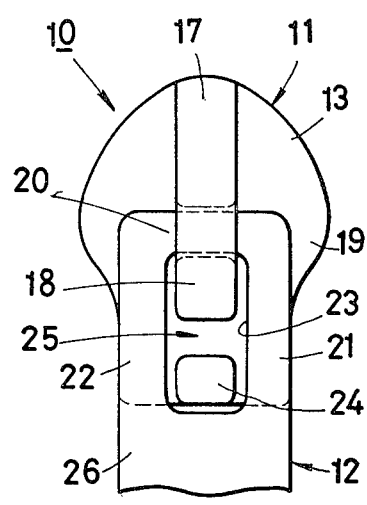
FIG. 1 is a top plan view of a slider provided in accordance with the invention.
Figure 2:
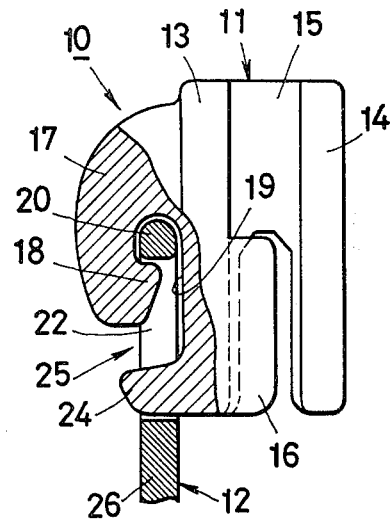
FIG. 2 is a side elevational view of the slider with parts broken away.

Referring now to the drawings and FIGS. 1 and 2 in particular, there is shown a slider 10 which is preferably made of a plastics material and which consists in general of a slider body 11 and a pull tab 12 pivotally mounted thereon. The slider body 11 comprises an upper wing 13 and a lower wing 14 which are connected at one end by a neck portion 15. The upper wing 13 has inwardly directed side flanges 16 which together with the neck portion 15 define a substantially Y-shaped guide channel for the passage of two parallel rows of fastener elements (not shown) during opening or closing of the fastener. The upper wing 13 is provided at its top surface with a hook-shaped supporting lug 17 integral with and projecting upwardly from the upper wing 13. The hook-shaped supporting lug 17 extends from one end of the slider body 11 in the longitudinal direction of the latter and terminates in a free end 18 bent downwardly toward and in opposed relation to the top surface 19 of the upper wing 13.

The pull tab 12 generally rectangular in shape has at one end a transversely extending pintle 20 which serves as a pivotal axis about which the pull tab 12 is pivoted in a well known manner. The pull tab 12 has arms 21 and 22 extending in spaced parallel relation on opposite sides of an elongate opening 23 in the pull tab 12 and connected together by the pintle 20. It is to be noted that the thickness of the pintle 20 is greater than the distance between the free end 18 of the lug 17 and the top surface 19 of the upper wing 13, so that once the pintle 20 is thrusted into snapping engagement with the lug 17, it can be prevented from getting out of engagement with the lug 17 against pulling forces on the pull tab 12 during normal use of the slider 10.

According to an important aspect of the invention, there is provided at the other end of the slider body 11 a projection 24 integral with and extending upwardly from the upper wing 13. The projection 24 is disposed in alignment with the lug 17 and spaced apart from and in opposed relation to the lug end 18 by a gap 25 which is sufficiently large to permit the pintle 20 to pass therethrough unobstructedly during the pull tab assembling operation. An inspection of FIGS. 1 and 2 indicates that the projection 24 is dimensioned to engage loosely with the elongate opening 23 of the pull tab 12 and to extend upwardly slightly beyond the exposed upper surface 26 of the pull tab 12 when the latter is moved down into face-to-face contact with the top surface 19 of the upper wing 13.

Figure 3:
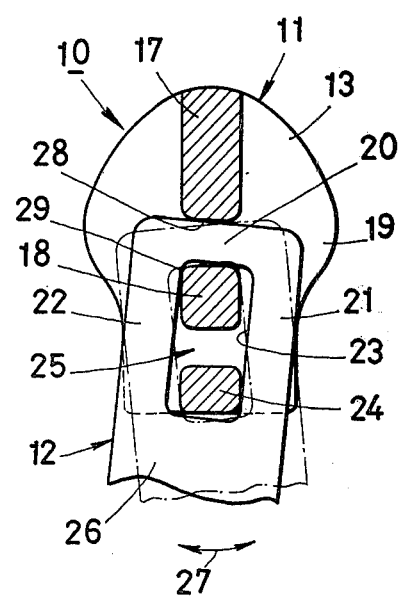
FIG. 3 is a top plan view of the slider, partially cut away, in which the pull tab is displaced slightly horizontally relative to the longitudinal axis of the slider body.

With this slider structure, the pintle 20 of the pull tab 12 is inserted through the gap 25 and then thrusted between the free end 18 and the top surface 19 into snapping engagement with the lug 17 with the free end 18 raised resiliently, so that the pull tab 12 may be mounted stably on the slider body 11. As best seen from FIG. 3, when the pull tab 12 is rotated into contact with the top surface 19, the projection 24 fitted in the elongate opening 23 abuts against and prevents the pull tab 12 from becoming further displaced horizontally relative to the longitudinal axis of the slider body 11 against severe stresses tending to pivot the pull tab 12 in the direction of the arrow 27 about a fulcrum 28 on the lug 17 against which the lug-journaled pintle 20 bears. The horizontal movement of the pull tab 12 is prevented also by the pintle 20 when the latter is urged into abutting engagement with the fulcrum 28 and a corner 29 of the free end 18. Therefore, the pull tab 12 when brought into contact with the top surface 19 can be held stably in position on the slider body 11 against accidental stresses exerted on the pull tab 12 which would otherwise force the pintle 20 to raise the free end 18 and finally take itself out of engagement with the lug 17.

Figure 4:
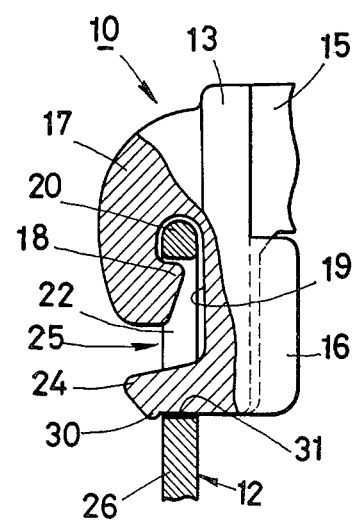
FIG. 4 is a side elevational view, with parts broken away, of a slider according to another embodiment of the invention.

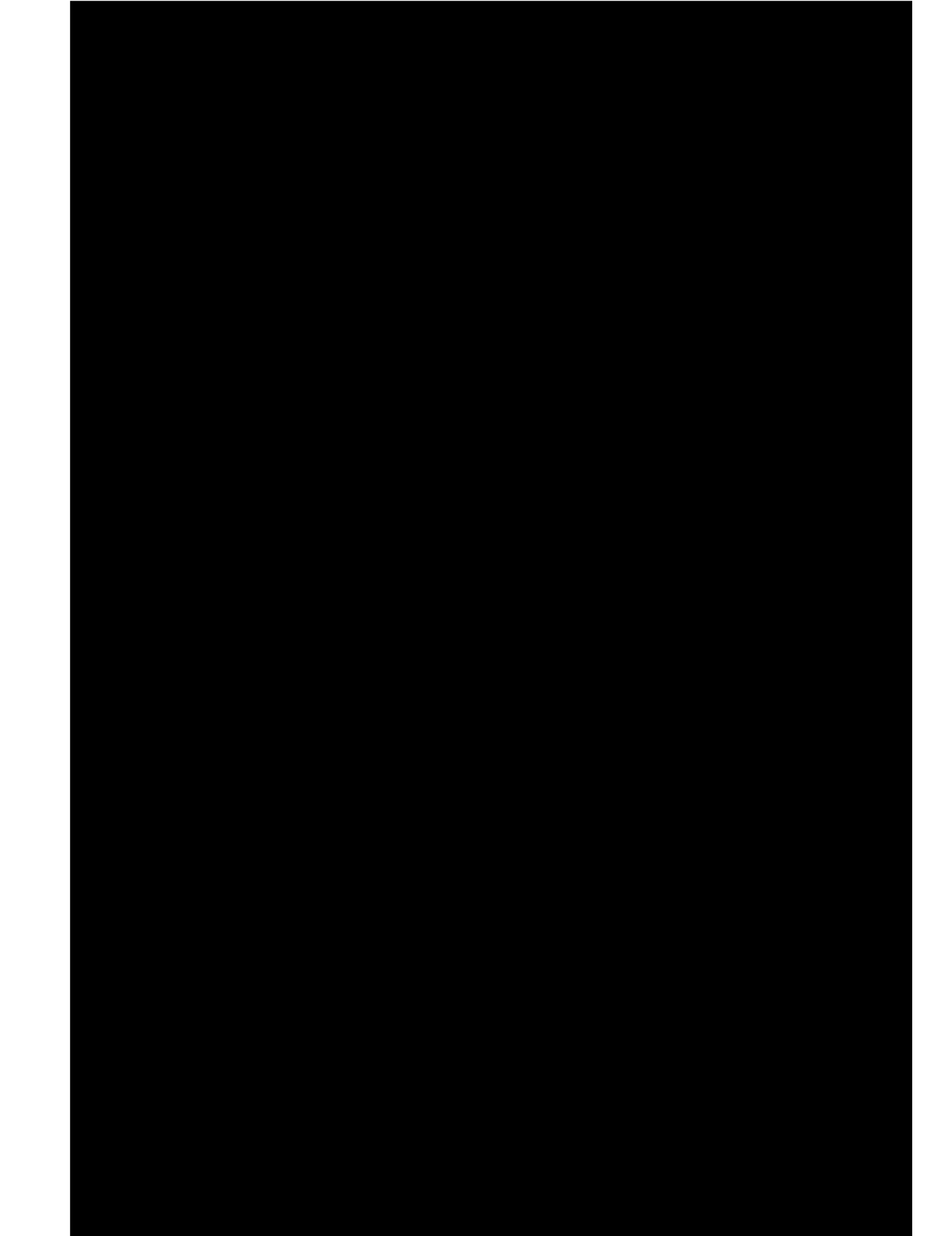

FIG. 4 shows a modification in which the projection 24 is provided with a laterally extending ledge 30 adapted for stopping engagement with a rear marginal edge 31 of the opening 23, thereby preventing the pull